United States Patent [19]

Ichikawa et al.

[11] Patent Number: 5,064,589

[45] Date of Patent: Nov. 12, 1991

[54] METHOD FOR PRODUCING HIGH DENSITY HEXAAGONAL BORON NITRIDE SINTERED ARTICLE

[75] Inventors: Kagetaka Ichikawa; Takao Noda, both of Shiojiri, Japan

[73] Assignee: Showa Denko K.K., Tokyo, Japan

[21] Appl. No.: 660,264

[22] Filed: Feb. 26, 1991

Related U.S. Application Data

[63] Continuation of Ser. No. 459,317, Dec. 29, 1989, abandoned.

[51] Int. Cl.$^5$ .......................... F27D 7/02; C04B 35/58
[52] U.S. Cl. ........................................ 264/65; 501/87; 501/96; 501/98; 423/290; 264/332
[58] Field of Search .......................... 501/87, 96, 98; 423/290; 264/65, 332

[56] References Cited

U.S. PATENT DOCUMENTS 4,287,164  9/1981  Endo et al. .................... 423/290
4,361,543  11/1982  Zhdanovich et al. ............. 423/290

FOREIGN PATENT DOCUMENTS 40-10422   5/1965   Japan .................................. 501/96
49-40124   6/1974   Japan .
59-162179  6/1984   Japan .
318061     10/1971  U.S.S.R. ............................. 501/96

OTHER PUBLICATIONS

*Journal of the European Ceramic Society,* 5(1989), "Hexagonal Boron Nitride: Fabrication, Properties . . . " A. Lipp et al.

*Primary Examiner*—Karl Group
*Assistant Examiner*—Anthony Green
*Attorney, Agent, or Firm*—Oblon, Spivak, McClelland, Maier & Neustadt

[57] ABSTRACT

A method for producing a high density boron nitride sintered body includes mixing high purity hexagonal boron nitride powder with 0.1 to 20% by weight of at least one alkaline earth metal, then shaping the resultant mixture and firing the resultant shaped body in a non-oxidizing atmosphere containing nitrogen.

12 Claims, No Drawings

METHOD FOR PRODUCING HIGH DENSITY HEXAAGONAL BORON NITRIDE SINTERED ARTICLE

This application is a continuation of application Ser. No. 07/459,317, filed on Dec. 29, 1989, now abandoned.

BACKGROUND OF THE INVENTION

1. Field of the Invention

This invention relates to a method for producing a sintered body of high density hexagonal boron nitride (hereinafter referred to simply as "boron nitride"), which is a ceramic material excelling in resistance to heat, resistance to thermal shock, lubricity, corrosion-proofness, electric insulating property, etc.

2. Prior Art Statement:

Boron nitride is a ceramic material having many outstanding properties i.e. excelling in thermal, chemical and electrical properties, possessing lubricity, and permitting easy machinability.

Thermally, it manifests stability in an inert atmosphere at temperatures up to about 3,000° C., exhibits extremely high thermal conductivity and great resistance to thermal shock. It also excels in chemical stability sufficiently to be less liable to be wet with and avoid reacting with a molten metal. Thus, it finds extensive utility in application to heat-resistant and corrosion-proof materials. Since it excels in lubricity as well as in thermal stability, it constitutes a valuable material for high-temperature lubricating products.

Further, since it exhibits extremely high electric resistance and undergoes only nominal change even at highly elevated temperatures, it forms an electrically insulating material usable over a wide range of temperatures.

Boron nitride, which excels in thermal and chemical properties, is so difficult to sinter that the production of a sintered body of this compound necessitates a mechanical treatment at highly elevated temperatures under high pressure. In making sintered bodies of boron nitride on an industrial scale, there is employed, for example, a method of hot pressing a fed material of boron nitride that contains $B_2O_3$ unreacted at the time of preparing the fed material of boron nitride or a method which accomplishes the production by mixing boron nitride powder with several to ten-odd percent of borates of alkaline earth metals such as, for example, $MgO \cdot B_2O_3$, $CaO \cdot B_2O_3$ and $SrO \cdot B_2O_3$ as a binder, packing the resultant mixture in a graphite die, and heating the mixture and the enclosing graphite die in a high-frequency induction heating furnace under application of pressure in the range of 200 to 400 kg/cm$^2$ at a temperature in the neighborhood of 2,000° C. (Japanese Patent Publication SHO 49(1974)-40124).

The present inventors formerly developed a method for the production of a sintered body of boron nitride containing only a small proportion of binder (Japanese Patent Public Disclosure SHO 59(1984)-162179). This method relies for sintering exclusively on the use of a hot press.

Japanese Patent Publication SHO 40(1965)-10422 discloses a method for the production of a body having a material of a low Young's elastic modulus uniformly distributed in a continuous phase formed of a material of a high Young's elastic modulus by mixing a dense refractory material of high Young's elastic modulus selected from the group consisting of the carbides of the metals of Groups IIIA, IVA, VA and VIA of the Periodic Table of Elements, the borides of the metals of Groups IVA, VA and VIA of the Periodic Table of Elements, the nitrides of the metals of Groups IIIA and IVA of the Periodic Table of Elements, the silicides of the metals of Groups IVA, VA and VIA of the Periodic Table of Elements, the oxides of the metals of Groups IIA, IIIA and IV of the Periodic Table of Elements, and the carbide, boride, nitride, and oxide of silicon with a refractory material of graphite or boron nitride having a low Young's elastic modulus and exposing the resultant mixture to the actions of high temperature and high pressure.

Of the conventional methods described above, the method which uses boron nitride containing unaltered $B_2O_3$ as a starting material for hot pressing and a method which uses an alkaline earth metal salt in a large amount as a binder have the following disadvantage.

The sintered bodies obtained by these conventional methods cannot fully manifest the outstanding characteristics inherent in boron nitride because they contain several to ten-odd percent of oxides, predominantly of $B_2O_3$. Though boron nitride itself is stable at elevated temperatures up to about 3,000° C. in an inert atmosphere, the sintered body containing oxide binder predominantly of $B_2O_3$ has a very severely limited working temperature because the binder spurts out of the sintered body at a temperature of one thousand several hundred degrees centigrade, reacts with other materials coming in contact with the sintered body, diffuses in the ambience and pollutes the immediate environment, and causes cracks in the sintered body of boron nitride.

When boron nitride free from the aforementioned disadvantage due to the inclusion of a binder of a relatively low melting point predominantly of $B_2O_3$ can be produced by a pressureless sintering method, a sintered body of a heretofore unattainable high quality ought to be obtained inexpensively.

The aforementioned method developed by the present inventors and disclosed in Japanese Patent Public Disclosure SHO 59(1984)-162179 uses a binder only in a small amount but requires exclusive use of a hot press for the purpose of sintering.

The refractory article produced by the method disclosed in Japanese Patent Publication SHO 40(1965)-10422 invariably contains graphite when it contains a continuous phase of boron nitride. Where boron nitride is present in the form of a dispersed phase, there occurs a continuous phase formed of a valuable combination of zirconium boride and molybdenum disilicide. Thus, in the refractory article as a finished product, the content of boron nitride is lowered. Further, since the sintering is not carried out in an atmosphere of nitrogen, any boron carbide contained in the raw material is not converted into boron nitride.

An object of this invention is to provide a method for producing a high purity boron nitride sintered body with high density and high strength easily under a pressureless condition, optionally omitting the use of a hot press.

SUMMARY OF THE INVENTION

The inventors, with a view to accomplishing the object described above, continued a diligent study on additives for use in the conventional method using a binder. They have consequently found that the object is attained by mixing boron nitride powder with boron carbide powder and an alkaline earth metal compound and firing the resultant mixture in an atmosphere of nitrogen. This invention has been perfected as a result.

Specifically, this invention relates to a method for producing a high density boron nitride sintered body, which essentially comprises mixing hexagonal boron nitride powder with 0.1 to 20% by weight of at least one alkaline earth metal compound and 0.1 to 20% by weight of boron carbide, then shaping the resultant mixture, and firing the shaped mixture in nitrogen or a non-oxidizing atmosphere containing nitrogen gas.

DESCRIPTION OF THE PREFERRED EMBODIMENT

Now, the present invention will be described in detail below.

Boron nitride powder is generally obtained as a product of enhanced crystallinity either by heating boric acid, anhydrous boron oxide, or borax in ammonia gas or by mixing the aforementioned boron source with a nitrogen-containing organic compound capable of releasing ammonia gas, heating the resultant mixture, and heating the resultant boron nitride at elevated temperatures in an atmosphere of nitrogen. The commercially available boron nitride which is obtained as described above generally has a crystal size roughly exceeding 1 $\mu$m.

When boron nitride is mixed with specific substances and the resultant mixture is heated again to induce growth of crystals as described above, the heated mixture acquires highly enhanced density. The fact that the powder of this nature is used as a raw material is advantageous in the respect that the shaped mixture acquires a high density and, as a result, the sintered body acquires a high density.

When commercially available boron nitride powder is mixed with 9% by weight of boric acid and 5% by weight as CaO of calcium carbonate and calcium fluoride and the resultant mixture is shaped in the form of briquettes and heated in an atmosphere of nitrogen at 2,000° C., the crystals consequently formed have a size in the range of 20 to 40 $\mu$m.

When the powder obtained in this manner is used in an unmodified form or in a pulverized form, the borate of the alkaline earth metal remains in a large amount in the produced sintered body. The borate of the alkaline earth metal is desired to be removed from the sintered body because it possibly bursts out in the form of liquid phase when the sintered body is heated to a temperature exceeding one thousand several hundred degrees centigrade. The borate of the alkaline earth metal can be easily removed from the boron nitride powder by treating the boron nitride powder with an inorganic acid such as, for example, hydrochloric acid.

As the starting material for this invention, boron nitride of any form may be used. For the purpose of obtaining a sintered body with high density and high strength, however, it is desirable to use boron nitride powder which has the crystallinity and purity thereof enhanced by subjecting this powder to various treatments. For practical purposes, the purity of this powder is required to be at least 90%.

Further, since the commercially available boron nitride powder and the powder having the crystallinity thereof enhanced by heat treating the powder in conjunction with such specific substances as described above generally have a coarse particle size, it is improper to use these powders in their unmodified form. Such a powder must be finely pulverized to a BET specific surface area of not less than 5 m$^2$/g, preferably not less than 20 m$^2$/g.

Now, the method for the production of a sintered body contemplated by this invention will be described more specifically below.

In a ball mill, for example, the finely powdered boron nitride is wet mixed thoroughly with 0.1 to 20% by weight of boron carbide powder and 0.1 to 20% by weight of an alkaline earth metal compound and the resultant mixture is dried and granulated. Where the sintering is carried out under a pressureless condition, the blended raw material is formed in a prescribed shape by the use of a steel die press or a rubber press or a combination thereof. To increase the green density, the forming is carried out under a pressure of not less than 1,000 kg/cm$^2$, preferably in the neighborhood of 2,000 kg/cm$^2$.

The forming need not be limited to the pressing method, of course, but may be effected by some other suitable method such as the slip cast method or the extrusion method so long as the produced shaped mixture acquires sufficient density.

The produced shaped mixture is black.

A white sintered body is obtained by heating the shaped mixture in nitrogen or a non-oxidizing atmosphere containing nitrogen at a temperature-increasing rate of 20° to 100° C./min. to a temperature in the range of 1,600° to 1,800° C., and firing the hot shaped mixture for two to ten hours, thereby causing boron carbide to react with nitrogen and consequently convert itself into boron nitride.

Where the sintering is carried out by the hot press method, the blended raw material is packed in a graphite die and fired by the use of a high-frequency induction heating furnace, for example, in an atmosphere of nitrogen at a temperature equal to or exceeding 1,800° C. under pressure in the range of 200 to 400 kg/cm$^2$. Since the graphite die is pervious to air, the shaped mixture undergoes the same reaction as described above and converts into a white sintered body.

Now, the action of additives will be described below.

Boron carbide is desired to have a particle diameter of not more than 50$\mu$m, preferably not more than 10$\mu$m.

The amount of boron carbide to be added is limited to the range of 0.1 to 20% by weight. The reason for this range is that the produced sintered body is deficient in density and strength when no boron carbide is added and the shaped mixture is deficient in density and the sintered body obtained by firing the shaped mixture does not have sufficiently high density when the amount of boron carbide added exceeds 20% by weight.

The carbon content of the sintered body of this invention is so small as to be 0.1% or less by weight. This fact indicates that the boron carbide added to the boron nitride, in the course of firing, reacts with the nitrogen in the atmosphere and consequently converts wholly into boron nitride.

The kind of the alkaline earth metal compound which is incorporated in the boron nitride in conjunction with boron carbide is not particularly critical. It is, however, economical to use an oxide of calcium or magnesium, or a carbonate or a hydroxide thereof. These alkaline earth metal compounds manifest a sufficient effect.

The amount of the alkaline earth metal compound to be incorporated is limited to the range of 0.1 to 20% by weight. The reason for this range is that when the alkaline earth metal is not incorporated the sintered body contains residual boron carbide, possesses a blackish gray interior, and is deficient in density and strength.

The ease with which the sintered body acquires improvement in density and strength increases in proportion as the amount of the alkaline earth metal compound to be incorporated increases. The high-temperature properties of the sintered body, however, are degraded when this amount increases excessively. The amount, therefore, must keep from exceeding 20% by weight.

EXAMPLES AND COMPARATIVE EXPERIMENTS

Now, this invention will be described more specifically below with reference to working examples and comparative experiments.

EXAMPLE 1

In a pot mill made of alumina, commercially available high-purity boron nitride (99.5% in purity) powder having a specific surface area of 5 $m^2/g$ was comminuted to a specific surface area of 20 $m^2/g$.

The resultant powder was mixed with 10% by weight of boron carbide having an average particle size of about 2 $\mu m$ and 5% by weight as CaO of calcium carbonate. In a pot mill made of alumina, the resultant mixture was mixed with water for 20 hours.

The wet mixture consequently formed was dried, disintegrated, preformed with steel dies, and then shaped with a rubber press under pressure of 2,000 $kg/cm^2$. The shaped mixture had a density of 1.82 $g/cm^3$. This shaped mixture was set in an electrically heating type tightly closed furnace, heated under a pressureless condition in the presence of flowing nitrogen gas at a temperature-increasing rate of 100° C. per hour to 1,700° C., retained at this temperature for 2 hours, then cooled within the furnace, and removed from the furnace. The sintered body thus produced had a density of 1.71 $g/cm^3$. A test piece ($3 \times 4 \times 35$ mm) cut from the sintered body was found to have a three-point bending strength of 335 $kg/cm^2$.

In the sintered body, the purity of boron nitride was 93.8% by weight, the carbon content was 0.05% by weight, and the boron carbide was substantially wholly converted into boron nitride.

EXAMPLE 2

The commercially available boron nitride was mixed with 5% by weight as CaO of calcium carbonate and calcium fluoride and 5% by weight as $B_2O_3$ of boric acid. The resultant mixture was shaped in the form of briquettes, placed in a graphite crucible, and fired by the use of a high-frequency inducting heating furnace in an atmosphere of nitrogen gas at 2,000° C. for 2 hours. The fired briquettes were cooled, removed from the furnace, comminuted in a ball mill made of alumina, and passed through a 40-mesh sieve. In a vessel made of polyethylene, 1 kg of the boron nitride obtained as described above and 200 cc of 12N hydrochloric acid and 20 liters of water were stirred at 50° C. for 5 hours. The stirred mixture was washed repeatedly with water until the washings showed a pH value of 7.0. Then, the washed mixture was filtered and then dried. The powder consequently obtained had an oxygen content of 0.8% and a calcium content of 0.2%.

The boron nitride powder of high crystallinity and high purity (99.7%) obtained as described above was comminuted in a ball mill to a specific surface area of 25 $m^2/g$.

This boron nitride powder was mixed with 5% by weight of boron carbide having an average particle size of about 1 $\mu m$ and 2% by weight as CaO of calcium carbonate. In a pot mill made of alumina, the resultant mixture and water were mixed for 20 hours. A sintered body was produced thereafter by following the procedure of Example 1.

The shaped mixture obtained here had a density of 1.93 $g/cm^3$.

The sintered body had a density of 1.79 $g/cm^3$ and a three-point bending strength of 650 $kg/cm^2$. In the sintered body, the boron nitride purity was 97.35% by weight and the carbon content was 0.04% by weight.

COMPARATIVE EXPERIMENT 1

A sintered body was produced by following the procedure of Example 1, except that the addition of boron carbide and calcium carbonate was omitted. This sintered body had a density of 1.52 $g/m^3$ and a three-point bending strength of 63 $kg/cm^2$.

COMPARATIVE EXPERIMENT 2

A sintered body was produced by following the procedure of Example 1, except that 3% by weight as $B_2O_3$ of boric acid and 4% by weight as CaO of calcium carbonate were incorporated in place of 10% by weight of boron carbonate and 5% by weight as CaO of calcium carbide.

The sintered body consequently obtained had a density of 1.45 $g/cm^3$ and a three-point bending strength of 162 $kg/cm^2$.

It is clearly noted from the working examples cited above that the boron nitride powder incorporating therein boron carbide and an alkaline earth metal compound could be densely sintered even under a pressureless condition and the sintered body consequently obtained possessed strength favorably comparable with the strength of the conventional hot-pressed boron nitride. Even when this sintered body was heated in an inert atmosphere to a temperature of about 1,800° C., it was thermally stable as evinced by the fact that the binder did not spurt from the sintered body.

In accordance with the present invention, a boron nitride sintered body is obtained with high quality inexpensively. Thus, the sintered body is expected to find extensive utility in various fields requiring resistance to heat, resistance to thermal shock, lubricity, corrosion-proofness, and electric insulating property.

What is claimed is:
1. A method for producing a high density hexagonal boron nitride sintered article, comprising:
   a) preparing a mixture consisting essentially of (i) hexagonal boron nitride powder, (ii) 0.1 to 20% by wt., based on the total amount of said mixture, of an alkaline earth metal compound selected from the group consisting of oxides, carbonates, and hydroxides of calcium and oxides, carbonates and hydroxides of magnesium, and (iii) 0.1 to 20% by wt., based on the total amount of said mixture, of boron carbide;
   b) shaping said mixture; and
   c) firing the shaped mixture at a temperature of at least 1,600° C. in a nitrogen-containing non-oxidizing atmosphere.

2. The method according to claim 1, wherein said hexagonal boron nitride powder has purity of at least 90%.

3. The method according to claim 1, wherein said hexagonal boron nitride has a BET specific surface area of at least 5 m²/g.

4. The method according to claim 3, wherein said hexagonal boron nitride has a BET specific surface area of at least 20 m²/g.

5. The method according to claim 1, wherein said nitrogen-containing non-oxidizing atmosphere is an atmosphere of nitrogen gas.

6. The method according to claim 1, wherein said boron carbide has a maximum particle size of 50 μm.

7. A method according to claim 1, wherein said boron carbide has a maximum particle size of 10 μm.

8. The method according to claim 1, wherein said mixture is shaped by at least one method selected from the group consisting of steel die pressing and rubber pressing.

9. The method according to claim 1, wherein said mixture is shaped by steel die pressing.

10. The method according to claim 9, wherein said steel die pressing is effected under a pressure in the range of 1000 kg/cm² to a pressure of about 2000 kg/cm².

11. The method according to claim 1, wherein said mixture is placed in graphite dies and fired at a temperature of at least 1,600° C. in a nitrogen-containing atmosphere, with said graphite dies kept under pressure in the range of 200 to 400 kg/cm².

12. The method according to claim 1, wherein the shaped mixture is heated to a temperature in the range of 1,600° C. to 1,800° C. at a temperature-increasing rate in the range of 20° C. to 100° C./min.

* * * * *

UNITED STATES PATENT AND TRADEMARK OFFICE
CERTIFICATE OF CORRECTION

PATENT NO. : 5,064,589
DATED : November 12, 1991
INVENTOR(S) : Kagetaka Ichikawa et al.

It is certified that error appears in the above-identified patent and that said Letters Patent is hereby corrected as shown below:

On the title page, Item [54] and Col. 1, line 1 should be, --METHOD FOR PRODUCING HIGH DENSITY HEXAGONAL BORON NITRIDE SINTERED ARTICLE--.

Signed and Sealed this

Twentieth Day of April, 1993

*Attest:*

MICHAEL K. KIRK

*Attesting Officer*   Acting Commissioner of Patents and Trademarks